July 3, 1934.    C. BROWN    1,965,450
VEHICLE
Filed July 20, 1929    3 Sheets-Sheet 1
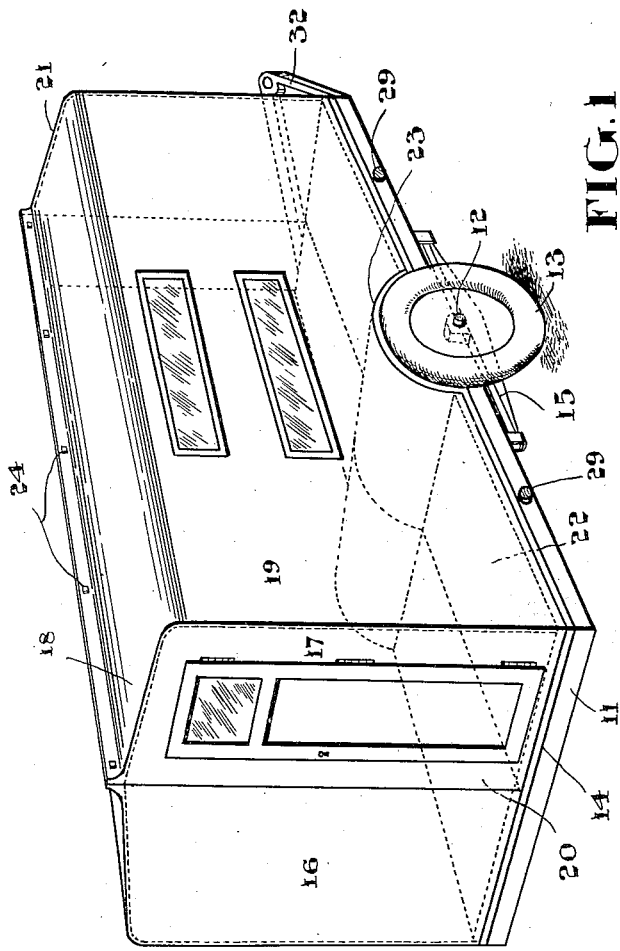
INVENTOR
CARLETON BROWN
BY Fetherstonhaugh&Co
ATORNEYS

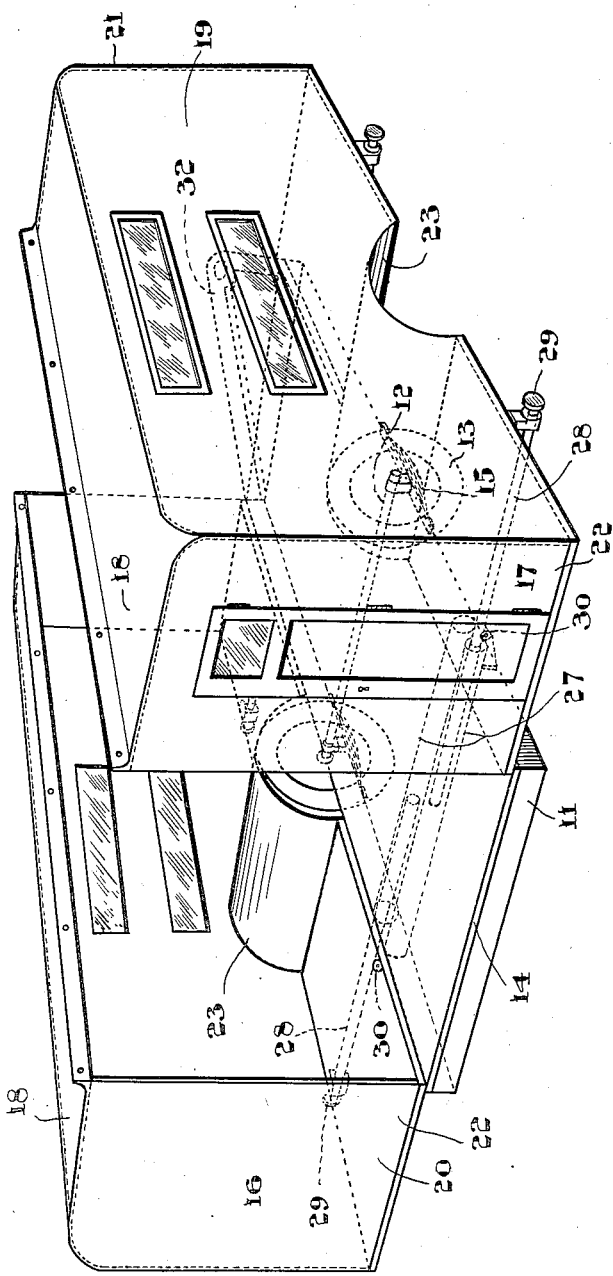

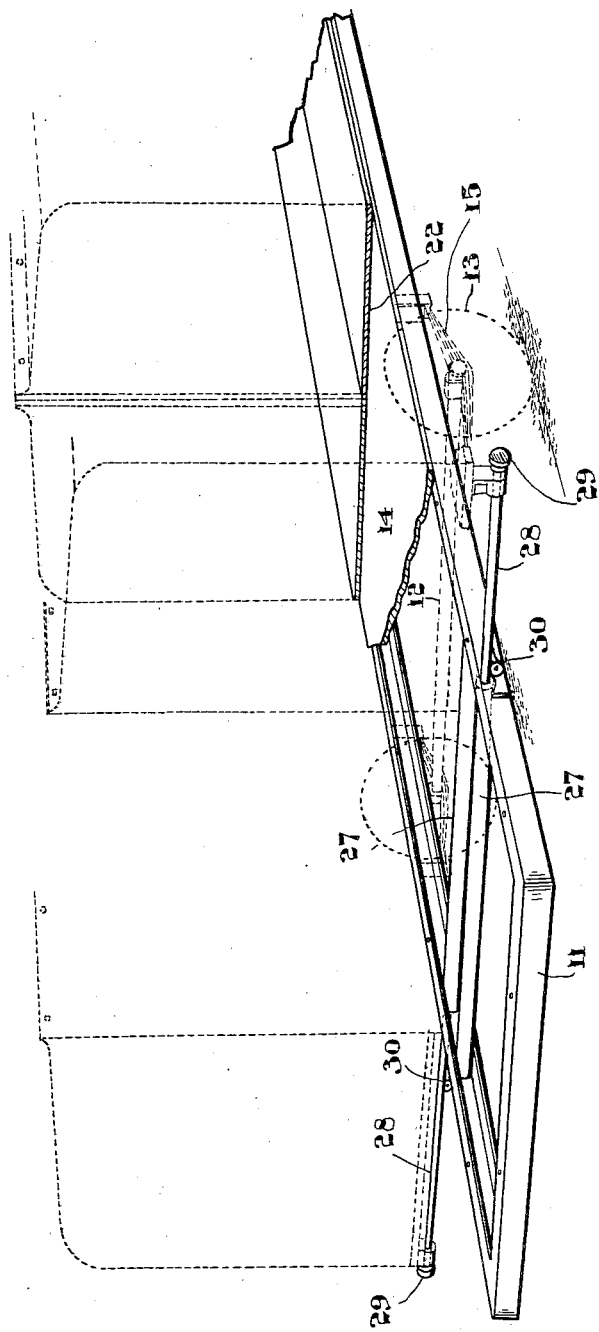

Patented July 3, 1934

1,965,450

UNITED STATES PATENT OFFICE 1,965,450

VEHICLE

Carleton Brown, Montreal, Quebec, Canada

Application July 20, 1929, Serial No. 379,794

4 Claims. (Cl. 296—23)

This invention relates to new and useful improvements in powered or unpowered vehicles and particularly to the construction of the body thereof and the object of the invention is to provide a vehicle body which may be conveniently split and expanded when desired. The body of the vehicle during its mobile state is substantially the same width as a motor vehicle proper, but during its parked or stationary state the entire body is completely split into a plurality of sections, preferably two. Through the expansion of the body, the floor area is substantially doubled, thereby providing ample space for the installation within the body sections of devices useful for touring, pleasure and commercial purposes.

According to my invention, I take any powered or unpowered chassis, and mount thereon a floor, preferably a permanent, fixed floor covering substantially the area encompassed by the chassis or vehicle frame. This floor functions as a floor proper when my vehicle body has been split into two or more sections and drawn apart. The vehicle body is superimposed upon the above described floor but the body likewise has its own floor quite irrespective of the chassis floor. The body is built in a plurality of sections, preferably two, and so designed that when two or more sections are temporarily joined together they mate or interlock, the joint between the sections being preferably in the longitudinal direction of the vehicle. Each half-body or split-body is an integral unit which consists of its own respective floor, walls and roof. Superimposed upon the above described vehicle chassis, I mount two or more, of my half-bodies or split-bodies and temporarily join them together, the joint taking place where the floors, walls and roofs meet. The two half-bodies thereupon become a whole body and I may provide in the walls and roofs of same, suitable apertures for windows, doors, ventilators and the like. The two split-bodies having been joined together and superimposed upon their respective vehicle chassis, are next bolted or otherwise secured to said chassis. When an increase of expansion is desired, I unfasten the body from its chassis, and then split or sever the body into its original two half-bodies already described and completely separate the two half-bodies by extending them away from one another in the transverse direction of the vehicle. In order that I may get maximum expansion by extending my half-bodies outwardly and past their points of equilibrium, I further provide suitable means whereby the split bodies are supported while in their cantilevered state, or during their state of expansion.

In the drawings which illustrate one form of my invention,

Figure 1 is a perspective view of my improved vehicle body in the form of a trailer adapted to be connected to a source of locomotion. This figure is for illustrative purposes only and it will be readily understood that the invention herein described is not confined to a trailer, but is adaptable to any type of powered or unpowered vehicle having two or more wheels.

Figure 2 is a perspective view of the vehicle body shown in Figure 1 in its expanded position.

Figure 3 is a perspective view of the chassis showing partly in section the permanent floor and the floor of each body unit.

Figure 4 is a sectional view showing the top of the body and the manner of connecting the sections when in transit.

Figure 5 shows a modification which may be made to the connection shown in Figure 4.

Referring more particularly to the drawings, 11 designates the chassis or frame of the vehicle which is mounted on the axle 12. The wheels 13 are rotatably secured to the ends of the axle. Secured to the chassis is the fixed floor 14, which, as shown, covers substantially the entire area of the chassis frame. A resilient connection such as the springs 15 may be made between the chassis or frame and the axle. Slidably connected to the chassis above the floor of same is the body of the vehicle. This body as shown is split, or completely severed into two half-bodies 16 and 17. Each half-body comprises a roof portion 18, a side 19, ends 20 and 21 and a floor 22. A wheel-well 23 is formed in each floor to clear the wheel when the body is moved to its expanded position. A plurality of wheel-wells are likewise installed in the event that the vehicle has more than two wheels, or when it is expedient so to do. The abutting edges of the roof, ends and floor, when in the position shown in Figure 1 are at the center of the vehicle and at substantially right angles to the axis of the axle. This means that the body of the vehicle is bolted or joined centrally in the longitudinal direction of the vehicle, when in its mobile or travelling condition, as shown in Figure 1. It will be seen that the roof portions are preferably arranged so that they slope downwardly from the line of contact of the body parts towards the sides thereof, so that rain may be shed therefrom. In the drawings, the shape of each roof portion is shown in ogee form or reverse curve form, with the central portion of same at a greater elevation than the side, forming a central peak, through which bolts 24 or like fastening means may be passed to connect the roof sections together as shown in Figure 4. In Figure 5, the bolts 25 are shown forming the connection between the sections, these bolts being adapted to pass through downwardly turned flanges 26 formed at the peak on the underside of the roof. The form shown in Figure 5 is a slight modification of the connection shown in Figure 4 and it will be readily understood that these connections are shown for illustrative purposes only and many other modifications may be made thereto. In like manner, the flanges joining the walls and floors may be joined either from the outside or inside of the vehicle. The half-bodies are each slidably connected to the chassis above the floor so that they may be quickly and conveniently moved from the position shown in Figure 1 to that shown in Figure 2. Many types of adjustable connections may be made to accomplish this movement of the half-bodies and for illustrative purposes only one type of connection is shown. Installed into the chassis frame, are a plurality of transverse members 27 preferably of tubular shape, which are attached to the longitudinal members of the chassis frame and slidably contained within said tubular members are the extensible tubular supports 28, the ends 29 of which are each connected in any suitable manner to the half-bodies, or they may be left unconnected. Anti-friction bearings 30 may be provided at the edges of the chassis to form a support for the tubular members 28, as they are withdrawn from their telescoped position. When the telescoped tubular supports are withdrawn and extended they support in cantilevered fashion the above described half-bodies. They are only extended for approximately half their own length for they are only required to support a half-body, hence the remaining or unprotruding portion of the tubular support is still securely housed in a bearing for a considerable distance. The half-bodies while sealed or closed together are secured to the chassis proper by bolts or any suitable means, such as the bolts 29. The chassis which is shown is illustrative of the trailer type and a link 32 is shown for connecting it to a source of locomotion, such as an automobile, or any other vehicle.

During the mobile or travelling state, the half-bodies are preferably transported in a connected and sealed condition, that is, with the two half-bodies firmly connected together, so that the width is substantially the same width as a vehicle proper as shown clearly in Figure 1. In this condition, the floors of the half-bodies overlie the floor of the chassis.

When the split bodies are about to be cantilevered, the telescopic transverse members are called into play. The outer members of the telescopic supports have two functions, one to give increased strength to the frame of the vehicle and the other to provide bearing and housing means to carry and rigidly support the inner telescopic members which can be extended when desired. Preferably, these members are of tubular form, so that in the supports they are a snug fit and provide a bearing throughout their entire length. The tubular members shown are for illustrative purposes only and any suitable type of support may be used without departing from the spirit of the invention. The rigid telescoped members are extended or telescoped outwardly from the transverse members and are in readiness to receive and support the weight of their respective cantilevered half-bodies. As each half-body is substantially the same weight as its mate and each half is extended for substantially the same distance from the central axis of the vehicle or chassis, the equilibrium of the vehicle remains substantially constant. It is obvious that when the half-bodies are split and drawn apart a space is created thereby subjecting the interiors of the half-bodies to rain or inclemencies of the weather. A temporary roof covering may be stretched between the roof peaks and the space between the adjacent edges of the ends may be closed by any suitable means, not shown, to keep the interior of the vehicle weather-proof.

Whereas the drawings have depicted my split bodies as being extended in the transverse direction of the vehicle, this is for illustrative purposes only and it will be readily understood that the body may be split and extended longitudinally of the chassis or vehicle without departing from the spirit of the invention. Moreover, although it is preferable to split the body centrally of the longitudinal axis so that the two half bodies may be of equal width, nevertheless, this is not essential as the half bodies may be of unequal width, if desired. The interior of the half bodies may, of course, be fitted with beds, cupboards, cooking appliances, or any devices whatever which may be useful for touring, pleasure, or commercial purposes. It will be obvious that this type of split body may be applied to a truck, autobus, or any type of frame or chassis, portable or stationary, without departing from my invention.

I am aware that it has been proposed to expand the sides of a vehicle body laterally, by extending telescopic sections transversely from the vehicle body proper. My invention, however, is essentially different, in that my individual sections, although capable of lateral movement, will, when joined together, constitute the rigid integral body member for the vehicle.

Having thus described my invention, what I claim is:

1. A vehicle comprising a chassis equipped with a floor, a split expansible non-telescopic body mounted on said floor, said body being split from end to end to provide two half sections normally abutting in a plane located between opposite sides of the chassis, each half section having its own floor, end walls and outer side walls and being movable outwardly on the chassis floor to a body expanding position wherein the said sections are completely separated in the lateral direction of the vehicle and supported with their floor portions projecting beyond the side edges of the chassis floor, and means carried by said sections adapted to form a complete roof for the body in the abutting position of said sections.

2. A vehicle comprising a chassis equipped with a floor, a split expansible non-telescopic body structure mounted on said floor, said body structure consisting, in the contracted state, solely of two half bodies abutting in a plane located between opposite margins of the chassis, each half section having its own floor, end walls and outer side walls and being movable outwardly on the chassis floor to a body expanding position wherein the floor of the half section is projected beyond the chassis floor, means for fastening together the abutting roof portions of said sections in the contracted state of the body, and means carried by the chassis for supporting said sections when the latter are projected to a body expanding position.

3. An expansible housing structure comprising a frame equipped with a floor, an expansible body mounted on said floor, said body being split longitudinally to provide two half sections normally arranged in abutting relation to form a completely enclosed body, each half section having its own floor, end walls and outer side wall and being movable outwardly on the floor of the frame to a body expanding position wherein the half sections are completely separated and disposed with their floor portions projecting beyond said first mentioned floor in overlapping relation therewith, a plurality of transversely extending tubular members secured to the underside of said frame and a plurality of supports slidably mounted in said tubular members, the outer ends of certain of said supports being connected to one of the half sections of the body and the outer ends of the remaining supports being connected to the remaining half section of the body.

4. An expansible housing structure comprising a frame equipped with a floor, an expansible body mounted on said floor, said body being split longitudinally to provide a pair of complementary half sections normally arranged in abutting relation to form a completely enclosed body, each half section having its own floor, end walls and outer side wall and being movable outwardly on the first mentioned floor to a body expanding position wherein the half sections are completely separated and disposed with their floor portions projecting beyond said first mentioned floor and means for supporting each half section in its outwardly moved position comprising a plurality of cantilever supports slidably mounted in suitable bearings supported beneath the frame and having their outer ends attached to said half section to move outwardly and inwardly therewith.

CARLETON BROWN.